(No Model.) 9 Sheets—Sheet 1.

O. SMITH.
COINING PRESS.

No. 574,227. Patented Dec. 29, 1896.

Fig. 1.

Witnesses:
Frank P. Prindle.
Henry C. Hazard.

Inventor:
Oberlin Smith, by
Prindle and Russell, his Attys (No Model.) 9 Sheets—Sheet 3.

O. SMITH.
COINING PRESS.

No. 574,227. Patented Dec. 29, 1896.

Fig. 3.

Witnesses:
Frank P. Prindle.
Henry C. Hazard.

Inventor.
Oberlin Smith, by
Prindle & Russell, his Attys.

(No Model.) 9 Sheets—Sheet 5.

O. SMITH.
COINING PRESS.

No. 574,227. Patented Dec. 29, 1896.

Witnesses
Frank P. Prindle.
Henry C. Hazard.

Inventor
Oberlin Smith, by
Prindle and Russell, his Attys (No Model.) 9 Sheets—Sheet 7.

O. SMITH.
COINING PRESS.

No. 574,227. Patented Dec. 29, 1896.

Witnesses.
Frank P. Prindle.
Henry C. Hazard.

Inventor.
Obulin Smith, by
Prindle and Russell his Attys (No Model.) 9 Sheets—Sheet 8.

O. SMITH.
COINING PRESS.

No. 574,227. Patented Dec. 29, 1896.

Fig. 11.

Witnesses
Frank P. Prindle.
Henry C. Hazard.

Inventor
Oberlin Smith, by
Prindle and Russell, his attys (No Model.)   9 Sheets—Sheet 9.
O. SMITH.
COINING PRESS.

No. 574,227. Patented Dec. 29, 1896.

Witnesses
Frank Prindle
Henry C. Hazard

Inventor
Obelin Smith, by
Prindle and Russell, his Attys

UNITED STATES PATENT OFFICE.

OBERLIN SMITH, OF BRIDGETON, NEW JERSEY.

COINING-PRESS.

SPECIFICATION forming part of Letters Patent No. 574,227, dated December 29, 1896.

Application filed June 5, 1896. Serial No. 594,454. (No model.)

*To all whom it may concern:*

Be it known that I, OBERLIN SMITH, of Bridgeton, in the county of Cumberland, and in the State of New Jersey, have invented certain new and useful Improvements in Coining-Presses; and I do hereby declare that the following is a full, clear, and exact description thereof, reference being had to the accompanying drawings, in which—

Letters of like name and kind refer to like parts in each of the figures.

Figure 1:
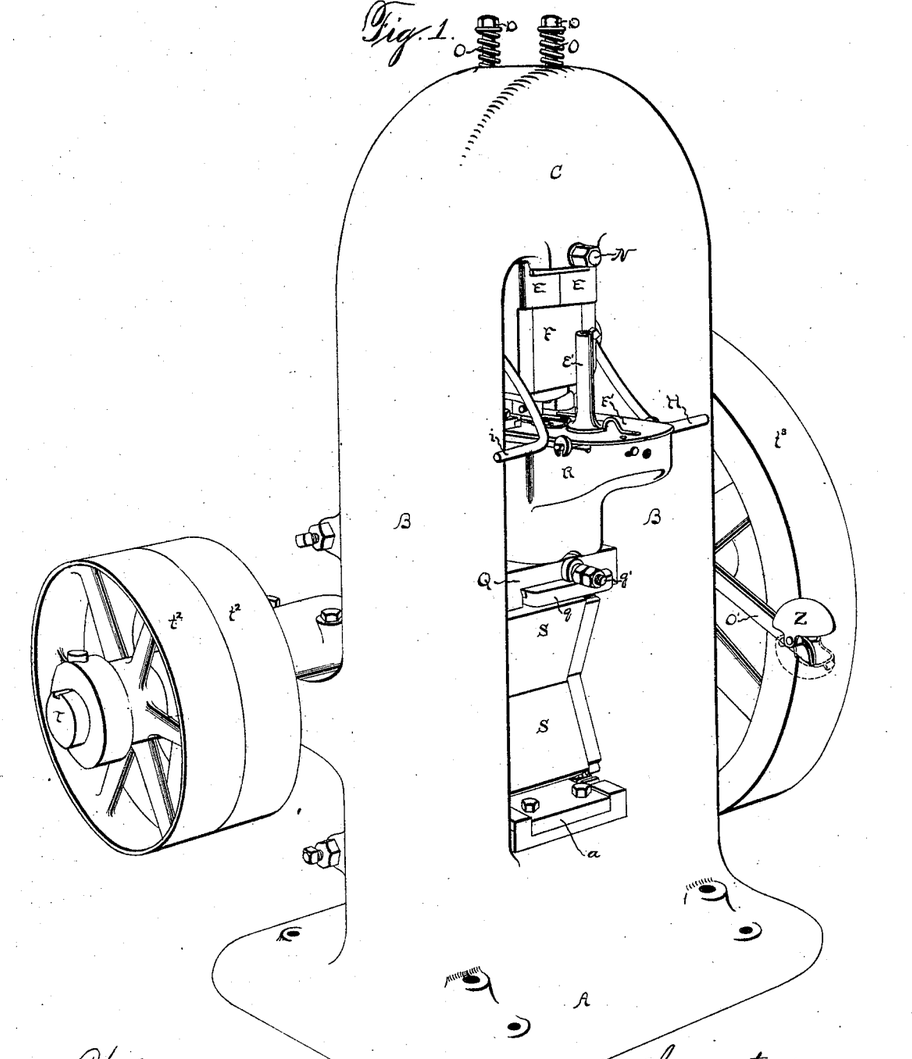
Figure 1 is a perspective view of my improved press.
Figure 2:
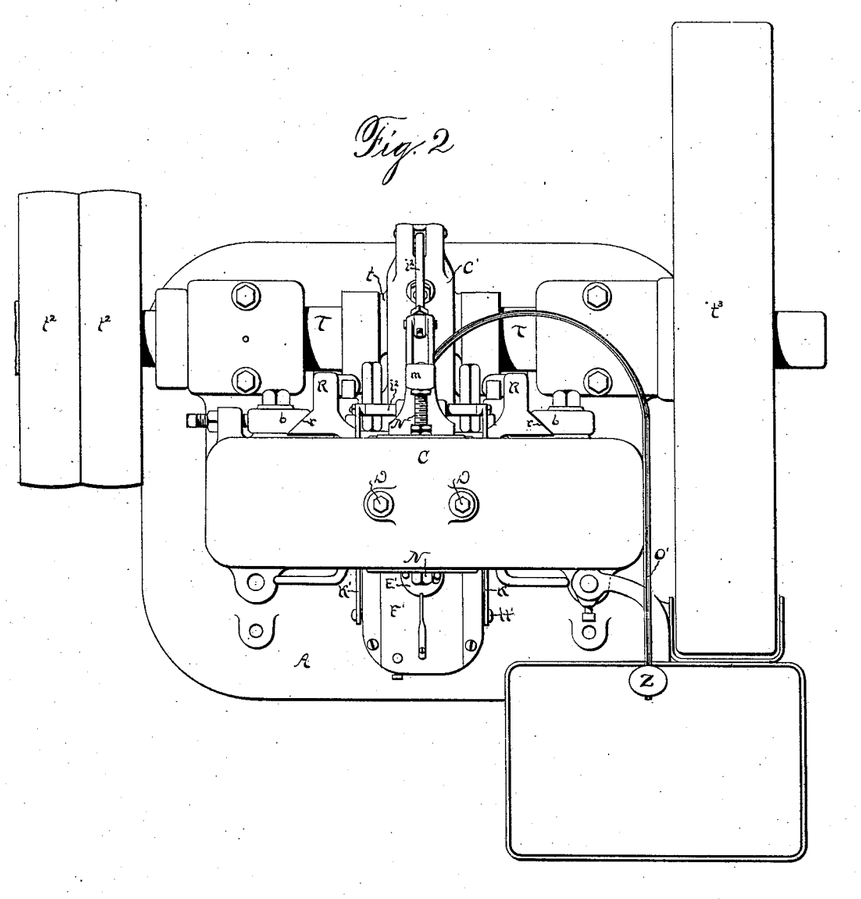
Fig. 2, a top plan view thereof.
Figure 3:
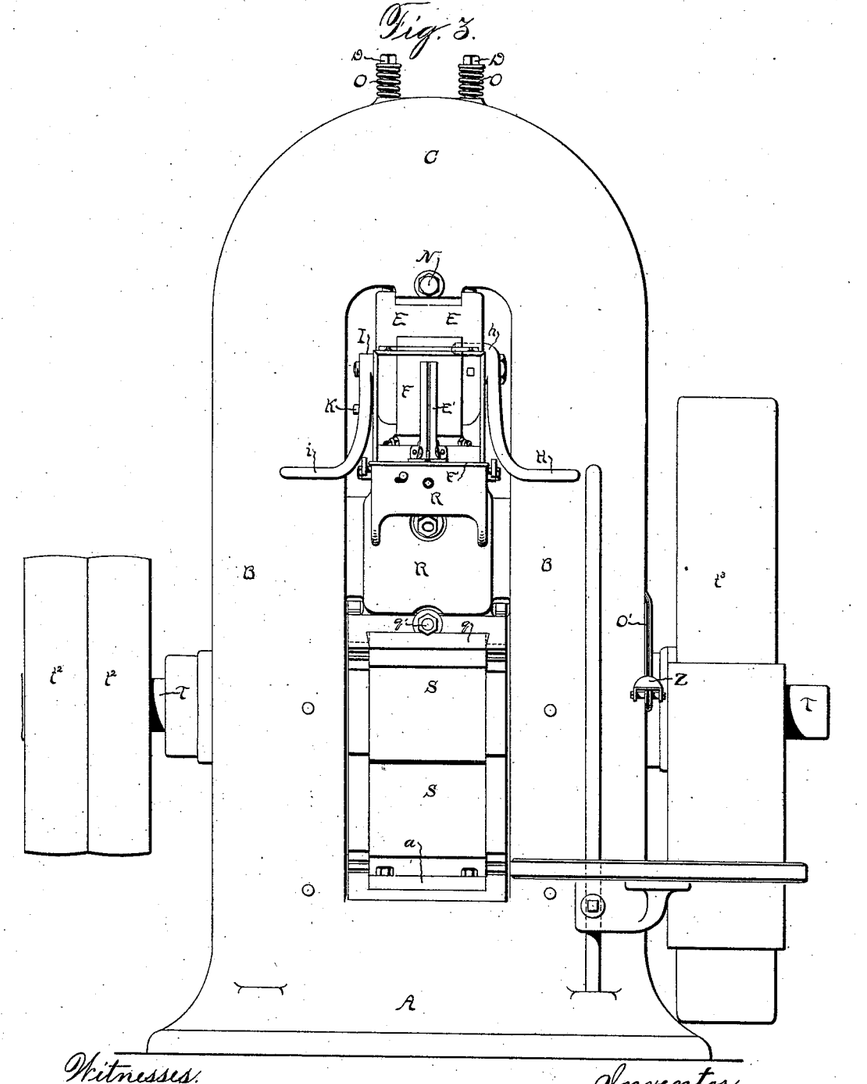
Fig. 3, a view of the same in front elevation.
Figure 4:
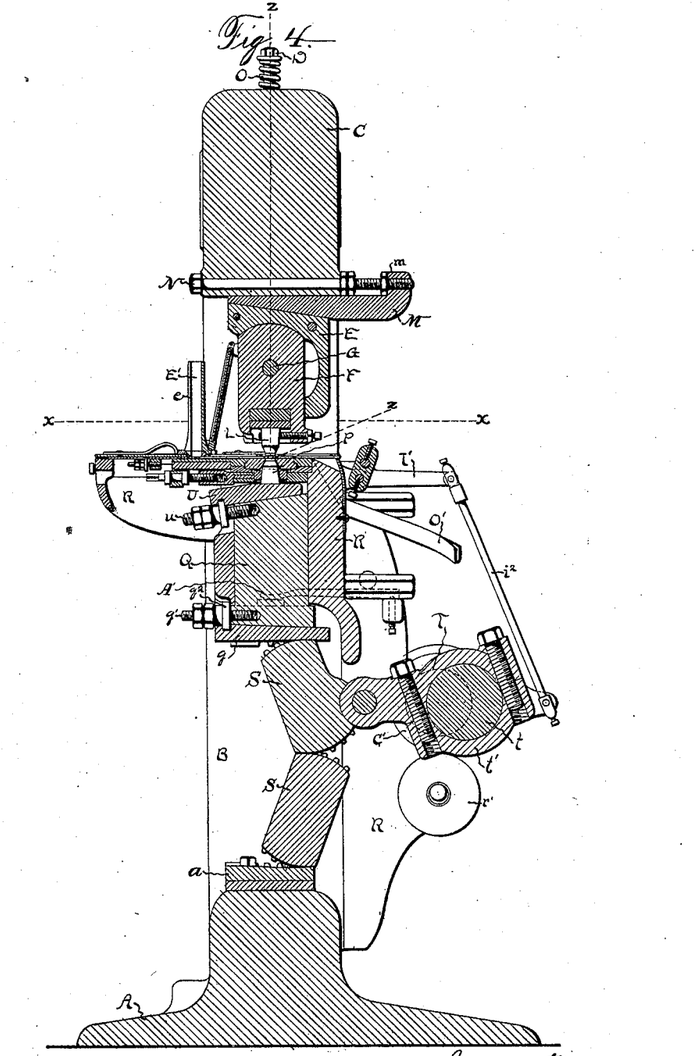
Fig. 4, a vertical section on a line passing from front to rear.
Figure 5:
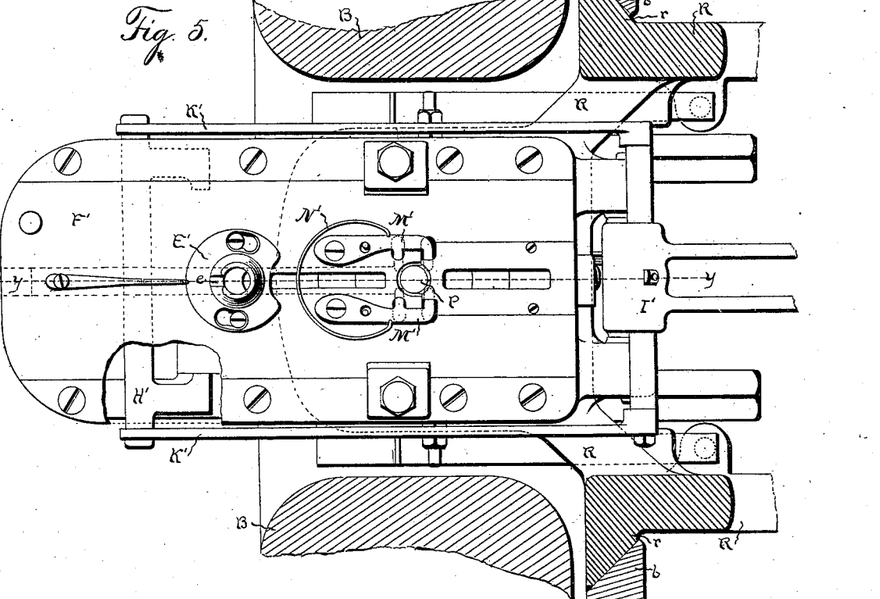
Fig. 5, a horizontal section on the line $x\,x$ of Fig. 4.
Figure 6:
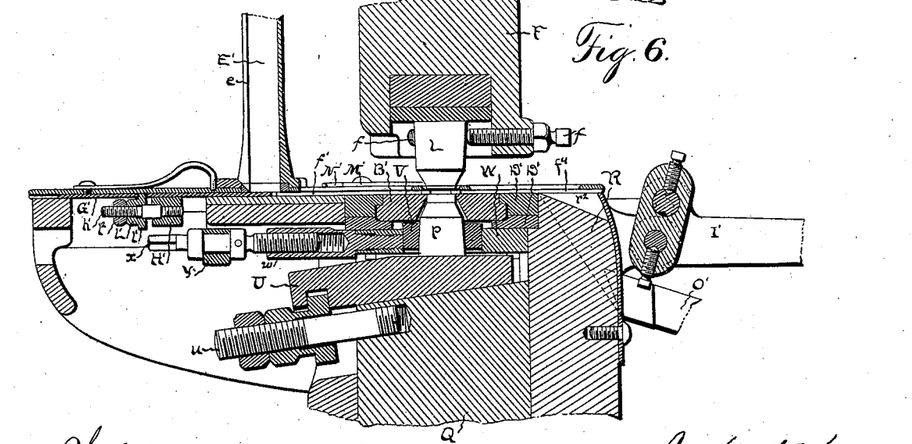
Fig. 6, a detail vertical section on the line $y\,y$ of Fig. 5.
Figure 7:
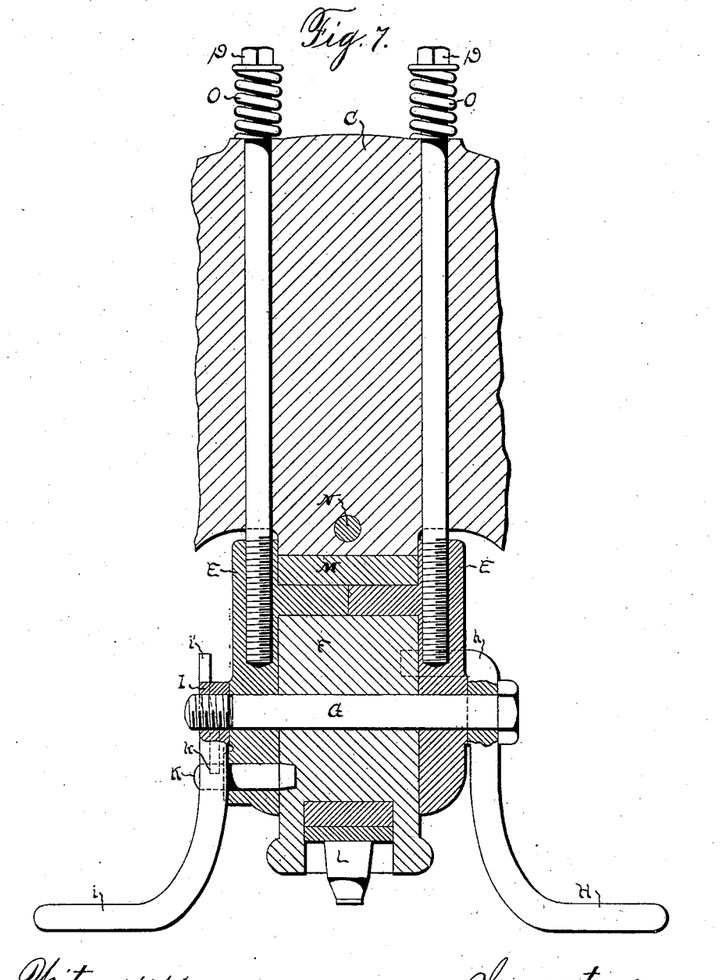
Fig. 7, a detail section on the line $z\,z$ of Fig. 4.
Figure 8:
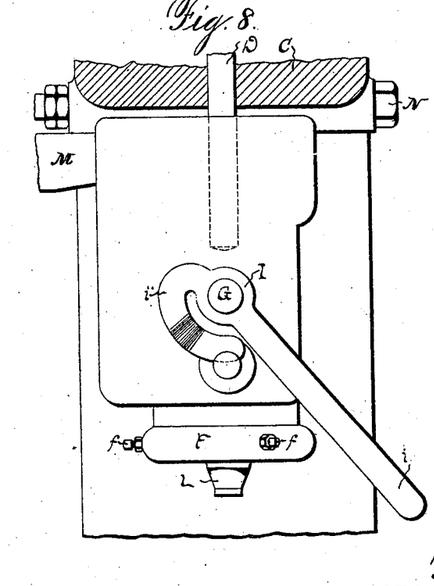
Figs. 8 and 9 are respectively views in elevation of opposite sides of the upper-die chuck.
Figure 9:
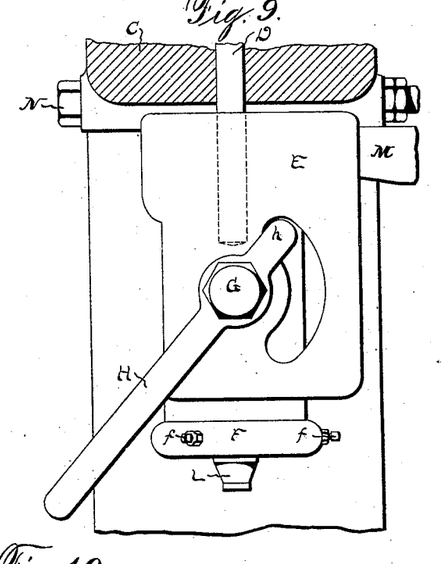
Figure 10:
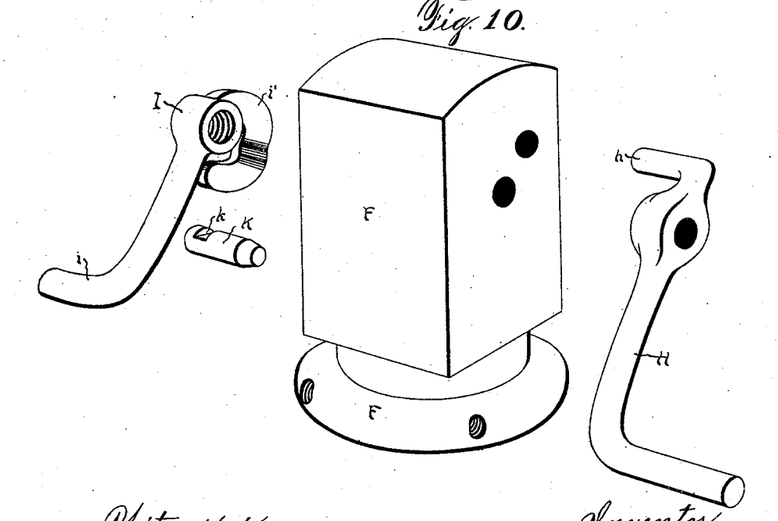
Fig. 10, a detail perspective view of said chuck and its operating handles or levers separated.
Figure 11:
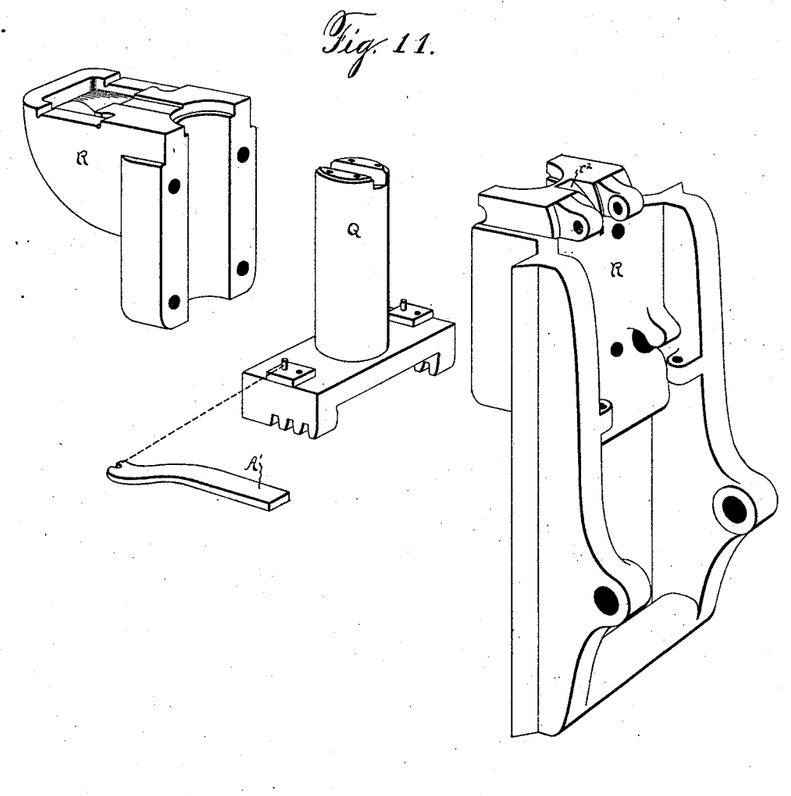
Fig. 11, a detail perspective view of the lower-die-carrying plunger and the parts of the movable frame in which it moves separated from each other.
Figure 12:
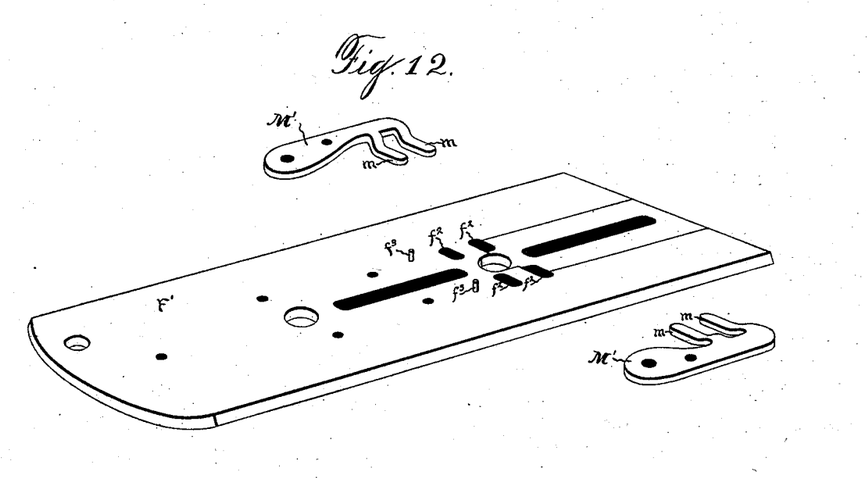
Fig. 12, a detail view in perspective of the top plate and the blank-centering and coin-ejecting arms separated, and Fig. 13 a detail top plan view of the die-ring-holding devices.
Figure 13:
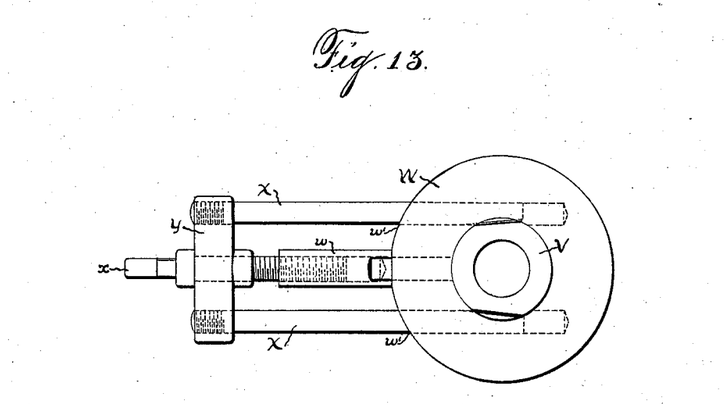

The object of my invention is to provide a press adapted more especially for coining or mintwork better than those heretofore used in respect to construction, operation, and manipulation; and to this end said invention consists in the press and in the parts thereof constructed and combined substantially as and for the purpose hereinafter specified.

As my invention has been devised with especial reference to coining or mint presses, I shall describe the same as embodied in such a press; but I do not wish to be understood as thereby confining myself only to such form of press as to those features of my invention which are applicable to other kinds of presses.

In the carrying of my invention into practice in constructing a coining-press I employ a cast-iron frame comprising a base A and two vertical posts or columns B and B, rising therefrom and connected at their tops by a curved or arched cross-piece C. Secured to the under side of said cross-piece by a pair of vertical bolts D and D, extending therethrough, are two blocks E and E, that are cut away or provided with cavities in their adjacent faces to receive a die holder or chuck F, placed therein and mounted upon a horizontal bolt G, passing through said blocks and through the chuck. The latter is adapted to be swung or turned upon the bolt by means of a handle or lever H, that is pivoted upon the bolt and has a cranked arm or extension $h$, that engages with the chuck. The nut I of the bolt is provided with a handle or lever $i$, by which it may be turned to cause the blocks E and E to be clamped upon or loosened from the chuck F to respectively prevent and permit movement of the chuck. Said chuck is positively and firmly locked from turning by a pin K, whose inner tapered end engages a correspondingly-shaped cavity in the side of the chuck, and which is longitudinally movable to engage it with and disengage it from said cavity, the moving means being a bent or cam arm $i'$, carried by the nut I, which coöperates with a slot or notch $k$ in the pin near its outer end. The turning of the nut I and the movement of the locking-pin K are thus effected by the use of the single handle $i'$.

The die L carried by the chuck F is the upper one of the pair for forming the obverse and reverse of the coin, and it is secured thereto in the usual way by screws $f$ and $f$. Adjustment vertically is provided for by the employment of a horizontal plate M, interposed between the under side of the cross-piece C and the top of the blocks E and E, said plate having its under side inclined and engaging a correspondingly-inclined surface on the blocks.

The plate is movable horizontally by means of a horizontal bolt N, passing through the cross-piece C and having its end threaded to engage a threaded opening in a lug $m$ on the upper side of said plate.

Coiled springs O and O, encircling the bolts D and D between the heads thereof and the top of the cross-piece C, operate to raise the blocks E and E and all of the parts carried thereby. It will therefore be seen that by moving the plate M in one direction the upper die will be lowered, while by moving it in the other direction the springs will raise it.

The upper die is stationary during a coining operation, the lower one P being the one that is moved. Said lower die is carried at the upper end of a vertically-movable plunger Q in the form of a cylindrical block mounted in a frame or casing R, and being moved upward by a toggle consisting of two blocks S and S, receiving movement from the crank $t$ on a shaft T, and one of which blocks engages the under side of said plunger and the other a bearing-plate $a$ on the base A of the frame between the two columns B and B. The two working surfaces of each of the two toggle-blocks are made round or convex, so as to produce an easy rolling action free from friction. On each side at each end each toggle-block is provided with a gear-segment by which the two blocks are geared together and to the respective parts against which they abut. Said gearing, however, is merely to keep the blocks in place and to cause them to move together, none of the thrust of the toggle being borne by the same. The connection between the shaft T and the toggle is by means of a pitman $t'$, that connects the crank $t$ with the upper toggle.

The pressure exerted by the toggle may be varied by the horizontal adjustment of a plate $q$, placed at the lower end of the plunger Q, and against the under side of which the upper end of the upper block S engages, and which is provided with the teeth that are engaged by those of said block. A screw $q'$, tapped into the plunger and having a collar $q^2$, that engages a notch in the top side of the plate $q$, constitutes the means for adjusting said plate. Vertical adjustment of the lower die P is obtained by mounting the same upon a sliding plate U on the upper end of the plunger, the latter having an inclined surface upon which said plate rests. An adjusting-screw $u$, similar to the screw $q'$, is provided for moving the plate U.

The proper motion is given to the plunger by making the lower surface of plate $q$ or the upper surface of plate $a$, or both, depart from true horizontal planes, or any or all of the rolling surfaces of toggles S S may depart from a truly cylindrical shape. By irregularly inclining one or more of these six surfaces, as shown in $a$, any desired "time" for the various successive parts of the motion may be obtained.

The lower die is secured in position upon the plunger by being placed within a bushing V, that in turn is placed within the central opening of a cap-piece W of the plunger, the diametrically opposite sides of said bushing being slabbed off or flattened on diverging lines and respectively engaged by the flattened ends of rods X and X. The latter are adapted to be moved longitudinally to cause them to bind against or be released from the bushing, and to enable them to be readily so moved they are attached at their outer ends to a bar Y, which has a swiveled connection with an adjusting-screw X, whose threaded portion engages an internally-threaded tube $w$, projecting horizontally from the plunger-cap W. The latter is provided with openings $w'$ $w'$ to receive the inner ends of said rods.

Engaging the upper side of a horizontal projection at each side of the lower end of the plunger is the free end of a flat spring $A'$, whose other end is suitably held, to cause said free end to tend to move the plunger downward in opposition to the action of the toggle.

In addition to the upper and lower dies for forming the obverse and reverse of the coin a third die part is employed for forming the circumferential edge thereof, said third die consisting of an annulus or ring $B'$, having the required internal diameter. Said ring is held at the top of the plunger casing or frame R by two rings $D'$ and $D'$, that are seated in a cavity in the frame and encircle and clamp the edge of said die-ring. For a reason hereinafter explained the latter has a movement relative to the lower die, and to obtain such the frame R is made vertically movable, being carried by two slides $r$ and $r$, that are mounted in guides $b$ and $b$, provided on the rear sides of the two columns B and B.

A cam $C'$ upon the shaft T, engaging a roller $r'$, connected with the slides $r$ and $r$, causes the downward movement of the frame R and the die-ring carried thereby, while upward movement thereof is produced by a spring or springs. Preferably the springs $A'$ and $A'$, that are provided to move the die-plunger Q downward, are utilized to move said frame R upward, the fixed end of each of said springs being suitably secured to one of the slides $r$. The downward movement of said slides places the springs under sufficient tension to enable the same to lower the plunger, while the upward movement of the latter produces a like effect as to the slides.

The roller $r'$ is mounted on an eccentric to enable the position of the die-ring to be adjusted vertically.

The blanks or planchettes are fed to the dies from a vertical tube-form hopper $E'$, placed upon a plate $F'$, secured to the upper side of the frame R and communicating at its bottom with a passage or way $f'$, beneath said plate, which leads to the dies. Running the entire length of the hopper from top to bottom at its front side is a slot or slit $e$, through which the blanks may be seen. The hopper, as shown, is detachably mounted upon the plate. In line with said passage $f'$, and reciprocable therethrough beneath the hopper, is a feeder bar or plate $G'$, adapted at its inner end to engage and move the blank a distance equal to its own diameter. Said feeder-bar is connected to and moved by a horizontal bar $H'$, moving beneath the plate $F'$ in suitable guides, and receiving its movement from a lever $I'$, to which its opposite ends are connected by rods or links $K'$ and $K'$. Said lever $I'$ is mounted in bearings at the rear side of the frame R, and is connected by a pitman $i^2$ with the pitman $t'$ upon the crank $t$.

Preferably the pitman $i^2$ is constructed of two telescopic parts that are connected, respectively, with the lever I' and the pitman $t'$ and between shoulders or stops on which is interposed a coiled spring. The object of this construction is to enable the feeder-bar to yield should an obstruction exist to the free travel of the blanks to the dies.

The connection between the feeder-bar and the bar H' is preferably an adjustable one to enable the position of the former to be nicely fixed, and it consists of a nut L' on a threaded rod or pin $h'$, secured to the bar H', which has a flange $l'$, that engages a slot or notch in the feeder-bar. Preferably a lock-nut $l^2$ is used to hold the nut L' in its adjusted position.

The blank to be operated on by the dies is centered and held in position by two arms M' and M', that are pivoted on opposite sides of the passage to the upper side of the top plate F' and have each a pair of fingers $m$ and $m$, that project inward toward the dies on opposite sides of the center thereof. The ends of said fingers are placed in line with the blank passage $f'$ by bending the fingers downward and passing them through slots or openings $f^2$ and $f^2$ in the top plate F'. The two arms M' and M' are normally pressed toward each other, to cause their fingers to inclose a blank, by means of a C-shaped spring N', their movement under the pressure of said spring being limited by stop-pins $f^3$ and $f^3$. The arms M' and M' yield before an oncoming blank when the latter is pressed against the fingers near the hopper, while the other fingers by impinging on the outgoing coin impart sufficient force to it to remove it from the press, along a way or passage $f^4$, extending from the dies in line with the delivery or feed passage, and discharging to a downwardly, rearwardly, and laterally inclined surface $r^3$ on the frame R, that turns the coin from a flatwise to an edgewise position and delivers it thus to a chute or passage O', by which it is carried to a suitable receptacle. The placing of the coin on its edge enables it to roll through the chute, and thus the abrasion, which would occur from sliding in a flatwise position, is avoided, a more rapid travel obtained, and a higher point of delivery from the chute secured, as less inclination has to be given the latter.

The plate F' is secured to the frame R in such manner as to permit its ready removal to enable access to the parts beneath.

The shaft T is provided at one end with fast and loose band-wheels $t^2$ and at its other end with a fly-wheel $t^3$. A cup Z is pivoted to the discharge end of the chute O', that it may be swung down to catch such coins as are delivered while the main receptacle is being changed for an empty one. Thus the press need not be stopped nor coins fall on the floor.

The operation of the machine is as follows:

The blanks or planchettes having been placed in the passage or way $f'$ in number sufficient to reach in a continuous line from the hopper to the first fingers $m$ and $m$ of the arms M' and M' and the hopper supplied with blanks, an inward movement of the feeder-bar H' will move the whole line of blanks and force the end one past said first fingers into position between the two dies, where it will be centered by the set of four fingers and placed within the die-ring B'. When the blank has been thus placed and while the feeder is moving inward for feeding another blank, the die-ring B' is raised by the upward movement of the frame R, caused by the two springs A' and A', to place said ring in proper relation to the upper die preliminary to the coining operation, and then the lower-die-carrying plunger is raised by the action of the toggle device to subject the blank to the action of the dies. In the meanwhile the feeder-bar has completed its outward and commenced its inward motion, but before the end blank is fed far enough to come into contact with the upper die, which is then in its path, the lower die starts downward, a little in advance of the downward movement of the die-ring B', to enable the friction of the coin edge on the ring to cause the separation of the coin from the lower die should it tend to remain thereon. The ring, however, has its speed accelerated, so that it reaches its lower limit of travel before the lower die reaches its lower limit of travel, and the coin is thus moved into contact with said die and thereby forced out of the ring in position to be engaged by the end one of the line of blanks and by the same forced from between the fingers $m$ and $m$ and delivered from the press.

It will be understood that the described relative movements of the lower die and ring are due to the formation of the cam C', which is shaped so as to produce the results described.

The die-ring is raised by springs in order to avoid possibility of injury should the blank by any mischance not get within said ring, the springs not being of sufficient power to move the parts so that harm could result.

The object in mounting the upper die in a swinging holder or chuck is to enable both dies to be easily accessible for inspection or cleaning, and such construction possesses the important advantage of enabling the two dies when in normal relation to be placed so close together as to result in material diminution of the amount of movement required to be given the lower or movable die. This movement or stroke need for ordinary coins be but about one-eighth inch, against one and one-half inches in the old machine. Furthermore, the feed movement or stroke need be but a coin diameter, against the six to eight inches usually employed. These stroke-reductions allow a very much faster speed, as well as minister to quiet smooth action and consequent durability.

It is of course to be understood that although the details of construction shown and described are preferred they may be varied without departure from the scope of the invention.

Having thus described my invention, what I claim is—

1. In a coining-press, the combination of the two coining-dies, means for moving one die toward and from the other for coining, a swinging support or holder for the other die, and means for holding said support immovable on its pivot, substantially as and for the purpose specified.

2. In a coining-press, the combination of the two coining-dies, arranged one above the other, means for moving the lower one toward and from the other, for coining, a movable support for the upper die by which the latter may be moved to expose itself and the lower die and means for holding said support immovable, substantially as and for the purpose shown.

3. In a die-press, the combination of the lower, movable die, the upper die, a support for the latter mounted on a horizontal pivot whereby said upper die may be moved outward and upward, to give access to itself and to the lower die, and means to hold said support in a fixed position during a coining operation, substantially as and for the purpose specified.

4. In a coining-press, the combination of the pivoted die holder or chuck, and a holding device therefor, adapted to be engaged with and disengaged therefrom to respectively prevent and permit its movement on its pivot, substantially as and for the purpose described.

5. In a coining-press, the combination of the pivoted die holder or chuck, the sectional part within which the same is pivoted, and means for clamping the sections of said part upon the chuck, substantially as and for the purpose specified.

6. In a die-press, the combination of the pivoted die holder or chuck, the two-part support within which the same is pivoted, a bolt passing through said support and through the chuck, and a clamping-nut on the bolt, substantially as and for the purpose shown.

7. In a die-press, the combination of the pivoted die holder or chuck, the part to which the same is pivoted, a locking-pin engaging said chuck, and a cam-arm engaging said pin, substantially as and for the purpose set forth.

8. In a die-press, the combination of the pivoted die holder or chuck, the part to which the same is pivoted, adapted to be clamped thereon, a locking-pin engaging said chuck, and means for operating said clamping device and the locking-pin, substantially as and for the purpose described.

9. In a die-press, the combination of the pivoted die holder or chuck, the part to which the same is pivoted, adapted to be clamped thereon, a locking-pin, and a single lever for operating the clamping device and the locking-pin, substantially as and for the purpose shown.

10. In a die-press, the combination of the pivoted die holder or chuck, the two-part support therefor, a bolt passing through said support and the chuck, a clamping-nut on the bolt, a sliding locking-pin, and a cam-arm attached to the nut, engaging said pin, substantially as and for the purpose specified.

11. In a die-press, the combination of two die parts mounted each on a suitable support, and means for imparting a differential movement to said parts, substantially as and for the purpose specified.

12. In a die-press, the combination of the two dies adapted to form opposite sides of the article to be formed, a die-ring, movable relative to said dies and means for imparting a differential movement to said ring and one of the dies, substantially as and for the purpose set forth.

13. In a die-press, the combination of the two dies adapted to form opposite sides of the article to be formed, a die-ring, a support for the latter and for one of said dies, that are movable independently of each other and means for imparting a differential movement to said independently-movable supports, substantially as and for the purpose described.

14. In a die-press, the combination of the two dies, the plunger upon which one of the same is mounted, the frame in which said plunger is movable, the die-ring carried by said frame, and means to move said frame, substantially as and for the purpose specified.

15. In a die-press, the combination of the two dies, the plunger upon which one of the same is mounted, the frame in which said plunger is movable, the die-ring carried by said frame, and the spring or springs for moving said frame toward the other die, substantially as and for the purpose shown.

16. In a die-press, the combination of the die, the plate around the same, and the clamping-rods at opposite sides for holding said die, substantially as and for the purpose set forth.

17. In a die-press, the combination of the die, the bushing provided with flattened sides, the plate around the bushing, and the two rods engaging the flattened sides thereof, substantially as and for the purpose described.

18. In a die-press, the combination of the die, the bushing provided with flattened sides, the plates surrounding the bushing, the two rods engaging the flattened sides thereof, and a screw device for moving said rods, substantially as and for the purpose specified.

19. In a die-press, the combination of the reciprocating die-carrying plunger, the reciprocating ring-carrying frame or part, the spring or springs engaging both of said parts, and means to move each in opposition to the springs, substantially as and for the purpose shown.

20. In a die-press, the combination of the dies, feed mechanism, and two pivoted arms having each fingers that project in the path of a blank moved by the feed mechanism, adjacent to the dies, engage and hold the blank in line with the latter, and engage and expel the finished product, substantially as and for the purpose specified.

21. In a die-press, the combination of the stamping-dies, the feed mechanism, and the two pivoted, spring-actuated arms extending in the direction of the line of feed having each fingers that are engaged by the forward side of the blank as it moves to the dies, and fingers that engage the rear side of the product of the dies, substantially as and for the purpose shown.

22. In a die-press, the combination of the dies, the hopper, the passage or way leading from the latter to the dies, the reciprocating feeder-bar, and the pivoted spring-actuated fingers projecting into such way in line with the dies, substantially as and for the purpose set forth.

23. In a press, the combination of the plunger or part to be moved, the relatively stationary part, the two toggle-blocks, interposed between and abutting against said parts, and abutting against each other, the abutting surfaces of the blocks being rounded convexly, a crank, and connections between the latter and one of said blocks, substantially as and for the purpose described.

24. In a press, the combination of the plunger or part to be moved, the relatively stationary part, the two toggle-blocks interposed between and abutting said parts and against each other, the abutting surfaces of the blocks being rounded convexly, intermeshing teeth gearing said blocks together and to said other parts, a crank, and a pitman connecting the same to one of said blocks, substantially as and for the purpose specified.

25. In a press, the combination of the dies, the discharge-chute, and a temporary receptacle pivoted to the chute and movable into and out of position at the discharge end of the chute, substantially as and for the purpose described.

26. In a press, the combination of the plunger or the part to be moved, the relatively stationary part, the two toggle-blocks interposed between and abutting against said parts, and abutting against each other, certain of said abutting surfaces being cam-like or irregular, a crank, and connections between the crank and one of said blocks, substantially as and for the purpose specified.

In testimony that I claim the foregoing I have hereunto set my hand this 19th day of May, A. D. 1896.

OBERLIN SMITH.

Witnesses:
JAMES J. REEVES,
HUGH L. REEVES.